RHYTHMICAL TELEGRAPH SYSTEM

Filed Feb. 26, 1962 2 Sheets-Sheet 1

INVENTOR
MARTINUS J. HOEK
BY Frank R. Trifari
AGENT

INVENTOR
MARTINUS J. HOEK
BY Frank R. Trifari
AGENT 3,234,509
Patented Feb. 8, 1966

3,234,509

RHYTHMICAL TELEGRAPH SYSTEM

Martinus Jacobus Hoek, Hilversum, Netherlands, assignor to North American Philips Company, Inc., New York, N.Y., a corporation of Delaware Filed Feb. 26, 1962, Ser. No. 175,448
Claims priority, application Netherlands, Mar. 13, 1961, 262,311
8 Claims. (Cl. 340—146.1)

The invention relates to a rhythmic telegraph system of the type providing for automatic signalling of a "request for repeat" signal by the receiver upon the detection of mutilated incoming elements. In this type of system the transmitter comprises a modulator connected to a transmitter oscillator. The output oscillations of the modulator are transmitted to the associated receiver. The transmitter also comprises a reading device connected to a storage device. The output signal of the reading device controls the modulator. The control-circuit includes a bistable device, which is adjusted in accordance with the character elements, that are read. A pulse generator is provided which periodically controls the reading device. In the associated receiver the oscillations emitted by the modulator are applied by way of a detector circuit, in order to form a telegraph signal, to a threshold circuit, controlled by a local pulse generator in synchronism with the centers of incoming character elements. The output pulses of the pulse generator actuate the threshold circuit for forming a signal. The local transmitter comprises means connected to the transmitting oscillator for modulating the oscillations with a characteristic signal when the level of the received signal intersects a threshold level. These modulated output oscillations are transmitted to the associated receiver.

Systems of the above kind are known in which the modulator modulates the frequency of the transmitter oscillator. In such a frequency shift system the emitted signal has two possible frequencies. One of these frequencies corresponds to the space elements and the other frequency to the mark elements of the telegraph character. It is known in this type of system to transmit the characteristic signal at a third frequency, which lies in between the two other frequencies. A signal of this third frequency is received in the associated receiver with the same intensity by way of the filters tuned to the two other frequencies, as a result of which the threshold circuit responds.

This solution has the disadvantage that the transmitter oscillator is usually not adapted to oscillate at a third frequency.

The omisison of transmission of any signal is also known. In this case no signal is received in the associated receiver by way of the filters tuned to the two frequencies and the threshold circuit can respond. A disadvantage of this system is that in the absence of a signal, the detector detects only noise and interference signals, so that there is a great possibility of the threshold circuit failing to respond. A further disadvantage is that a special modification of the transmitter oscillator is required. A disadvantage common to both of the above solutions is that it must be possible to feed a third signal, apart from the space elements and mark elements, to the transmitter.

The invention has for its object the provision of a system of the above kind, which permits the transmission in a simple manner of a characteristic signal by means of a modulator capable of modulating the transmitter oscillator so that it assumes one of the two possible transmitting states.

In accordance with the invention this object is achieved by providing the transmitter with a gate circuit connected to the pulse generator controlling the reading device by way of a delay circuit having a delay time equal to half the duration of a sign element. The output pulses of the gate circuit cause the bistable device to change its state, and a release signal can be fed to the normally blocked gate circuit. The release signal is derived from a device determining a time interval started by the threshold circuit.

In many known telegraph systems of the type referred to the telegraph receiver derives its synchronization signals from the transitions between the received mark and space elements. In accordance with a preferred embodiment of the invention, the number of transitions between mark and space polarity of the request for repeat signal is chosen to be smaller than the number of transitions between mark and space elements in the storage circuit. By this arrangement, in periods of continuous repetition the mean phase of the synchronization signals at the receiver is determined by the transitions of the character elements and not by the transitions in the request for repeat signals which are shifted over a half character element.

It should be noted here that systems are known in which the telegraph characters are translated into other characters having a constant ratio between the number of space elements and mark elements, wherein the receiver is capable of transmitting a characteristic character to the associated transmitter in the event that a mutilated character is received. In contradistinction thereto, this invention provides the advantage that the characteristic signal is not included in any sequence of character elements. This is particularly important in synchronizing the receiver, in known manner, with respect to the beginning of the characters.

The invention will now be described more fully with reference to the drawing, in which.

In the various figures identical reference numerals designate the same circuit elements.

Figure 1:
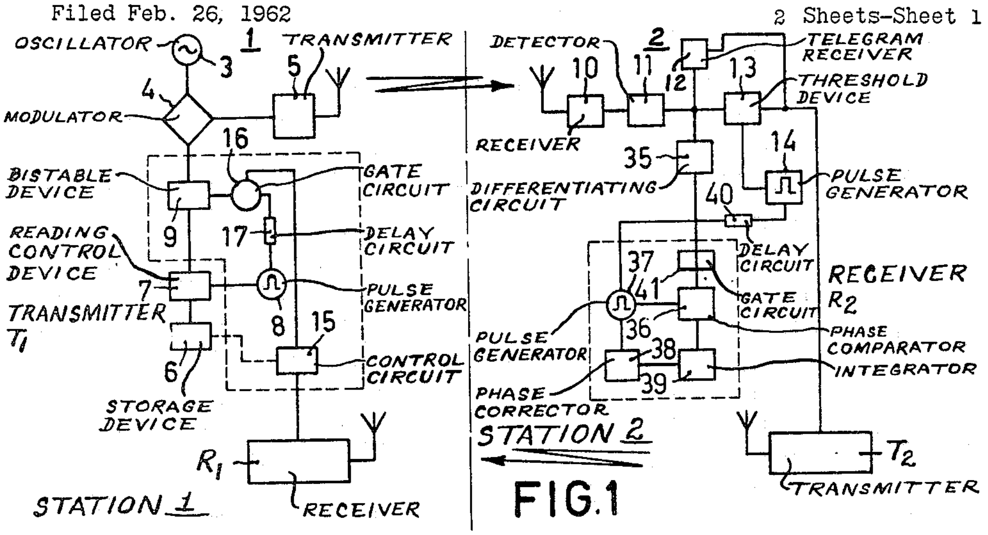
FIG. 1 is a block diagram of the system according to the invention.

Referring to FIG. 1, reference numerals 1 and 2 designate two stations, each having a transmitter and a receiver. Thus, station 1 has a transmitter $T_1$ and a receiver $R_1$, and station 2 has a transmitter $T_2$ and a receiver $R_2$. The transmitters are identical, as well as the receivers, so that only one transmitter and one receiver will be described. The transmitter $T_1$ of the station 1 transmits signals to the receiver $R_2$ of station 2, and the transmitter of the station 2 transmits signals to the receiver of the station 1. Transmitter $T_1$ comprises a transmitting oscillator 3 connected to a modulator 4. The output oscillations of the modulator 4 are emitted by way of a radio transmitter 5. Transmitter $T_1$ also comprises a storage device 6, in which signal elements are stored, and a reading control device 7. A pulse generator 8 delivers equally spaced timing pulses to the reading control device 7, so that, at the instance of the timing pulses, the reading control device 7 reads out the character elements from storage device 6 in the order in which they were stored therein. The output signal of the reading control device 7 controls a bistable device 9, for example a trigger circuit, in response to the character element read out of the storage device 6. One state of the bistable device corresponds to the space elements and the other state corresponds to the mark elements. The device 9 controls the modulator 4. This modulator is capable of modulating the oscillations of the transmitting oscillator 3 so that they assume one of two possible conditions. This means that the amplitude, the phase or the frequency of the oscillator signals are controlled by the modulator 4 in accordance with the state of the device 9.

Figure 3:
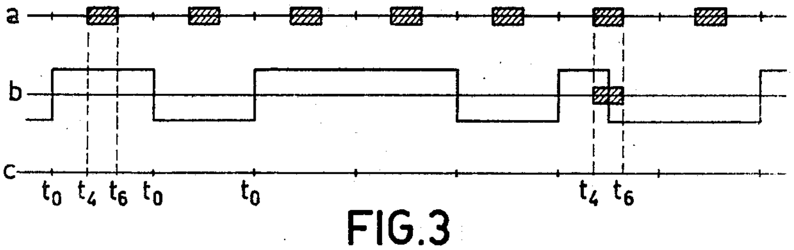
FIGS. 3, 4 and 5 are voltage-time diagrams for the explanation of the arrangements shown in FIGS. 1 and 2.

Receiver $R_2$ comprises a radio receiver 10 and a detector circuit 11. The detector may be any suitable detector adapted to detect the type of modulations which have been impressed on the transmitted oscillations by the modulator 4. The output signal of the detector 11 is a low-frequency telegraph signal. The detector 11 applies the telegraph signal to a telegraph receiver 12 and a threshold device 13. The threshold device tests the amplitude of the signal elements at instants corresponding to the centers of the elements. This is more clearly shown with reference to FIG. 3. FIG. 3*b* shows a telegraph signal, consisting (from left to right) of a space element, a mark element, two space elements and so forth. FIG. 3*c* illustrates a time axis subdivided into a number of time intervals equal to the duration of one signal element. The beginning of each element coincides with an instant $t_0$. The centers of the elements occur within the time interval between the instants $t_4$ and $t_6$. In FIG. 3*a* the operation of the threshold device 13 is illustrated by cross-hatched blocks which extend between the timing instants $t_4$ and $t_6$ on either side of the middle of the character elements. The horizontal line extending through the blocks corresponds to a reference level. The threshold device is controlled by a pulse generator 14 so that it is only operative between the timing instants $t_4$ and $t_6$ and it responds only if the difference between the signal level and the reference level is smaller than a threshold level as indicated by the upper and lower limiting levels of the cross-hatched blocks. Thus the threshold device responds if the level of the signal element intersects the threshold level. FIG. 3*b* illustrates one manner in which the level of the telegraph signal can intersect the threshold level. It should be noted that threshold devices of this type are known, so that a detailed description of such a device has been omitted. After response the threshold device supplies a signal to the telegraph receiver 12 and to the local transmitter $T_2$. The receiver 12 blocks its input in known manner, and does not accept character elements until, after a predetermined time interval, the associated transmitter has repeated the mutilated element.

The threshold device 13 also supplies a signal to the transmitter $T_2$ in the same station, so that this transmitter transmits a characteristic signal indicating the reception of a mutilated signal to the receiver $R_1$ of the other station. Since the transmitters and receivers are identical, it will be sufficient to describe in detail only the manner in which the transmitter $T_1$ responds to the reception of a signal from the receiver $R_1$ indicating reception of a mutilated signal by receiver $R_1$. It may be noted, in order to clarify the description, that the receivers respond to the characteristic signal (which indicates mutilation) in the same manner that they respond to a signal which is actually mutilated.

The transmitter $T_1$ of station 1 comprises a control circuit 15 connected to control the conduction of a gate circuit 16. An output of pulse genreator 8 is connected to the gate circuit 16 by way of a delay circuit 17. The delay circuit 17 provides a delay equal to half the duration of a signal element. The output of the gate circuit 16 is connected to bistable device 9, so that when a pulse passes through the gate circuit it causes the bistable device 9 to change its conduction state. The pulses of pulse generator 8 coincide with the leading edges of the character elements, so that when the gate circuit 16 is open, the delayed pulses from generator 8 cause the bistable device 9 to change its conduction state at the centers of the character elements, the number of times that the device 9 changes its conduction state at the centers of character elements in a given sequence depends upon the length of time that the gate 16 is held open, and this in turn is determined by the control circuit 15. When the bistable device 9 changes its conduction state at the center of an element, the modulator 4 thus causes the modulation condition of the transmitted oscillations to change in the center of a character element. This modulation change at the center of an element, which is indicative of the reception of a mutilated element, is hereinafter called the characteristic signal. The characteristic signal thus corresponds to a transition between a mark and space element, which occurs at the center of a normal element.

As stated above, the control circuit 15 determines the number of characteristic signals which are sequentially transmitted. After the control circuit 15 closes the gate 16 to stop transmission of characteristic signals, it starts a second time interval during which time it controls the storage device 6.

Storage device 6 comprises a known circuit of the type having a temporary storage circuit in which the character elements read out by the read control device 7 are stored for a predetermined time interval equal in duration to the sum of the first time interval (during which the gate 16 is open) and the second time interval. The temporary storage circuit may, for example, be a shift resistor which is stepped forward at the periodically recurring timing instants as determined by the pulses of pulse generator 8. At the start of the first time interval the output of the shift register is connected to its input (under control of device 15) so that the character elements read out from the shift register are reinserted at its input. The readout of character elements from the main part of store 6 is interrupted for the duration of both the first and second time intervals. At the start of the second time interval, at which time the characteristic signal has already been transmitted, the character elements are read out from the shift register and transmitted by read-out device 7 to the bistable device 9.

When the receiver $R_2$ receives a mutilated signal the threshold device 13 signals the transmitter $T_2$ of the reception of such a signal. As in the case of the transmitter $T_1$, the transmitter $T_2$ transmits a characteristic signal for a predetermined time. During this time the receiver $R_2$ has blocked itself from receiving signals. After this first predetermined time the transmitter $T_2$ transmits character elements stored in its temporary storage.

Upon receiving the characteristic signal from transmitter $T_2$, the receiver $R_1$ blocks itself temporarily and signals the control circuit 15 of transmitter $T_1$ of the reception of the characteristic signal (which was detected by receiver $R_1$ in the same manner as a mutilated signal). The control circuit 15 opens the gate circuit 16 so that delayed pulses from generator 8 cause the bistable device 9 to change its conduction state one or more times at instants corresponding to centers of character elements. This causes the transmitter $T_1$ to change its frequency at the center of a character element. The receiver $R_2$ is not responsive to this change, however, since it has been temporarily blocked.

After a predetermined time, the control circuit blocks the gate 16, so that the characteristic signals are no longer transmitted. Then the control circuit 15 signals the storage device 6 to read out its temporary storage, and these signals are transmitted by the transmitter $T_1$ in the normal manner. These repeated signals are received in the normal manner by the receiver $R_2$, since this receiver has now become unblocked. In the absence of any further reception of mutilated signals, the transmission continues normally. Since the receivers $R_1$ and $R_2$ and transmitters $T_1$ and $T_2$ are identical, both of the stations operate in the above-described manner.

Figure 2:
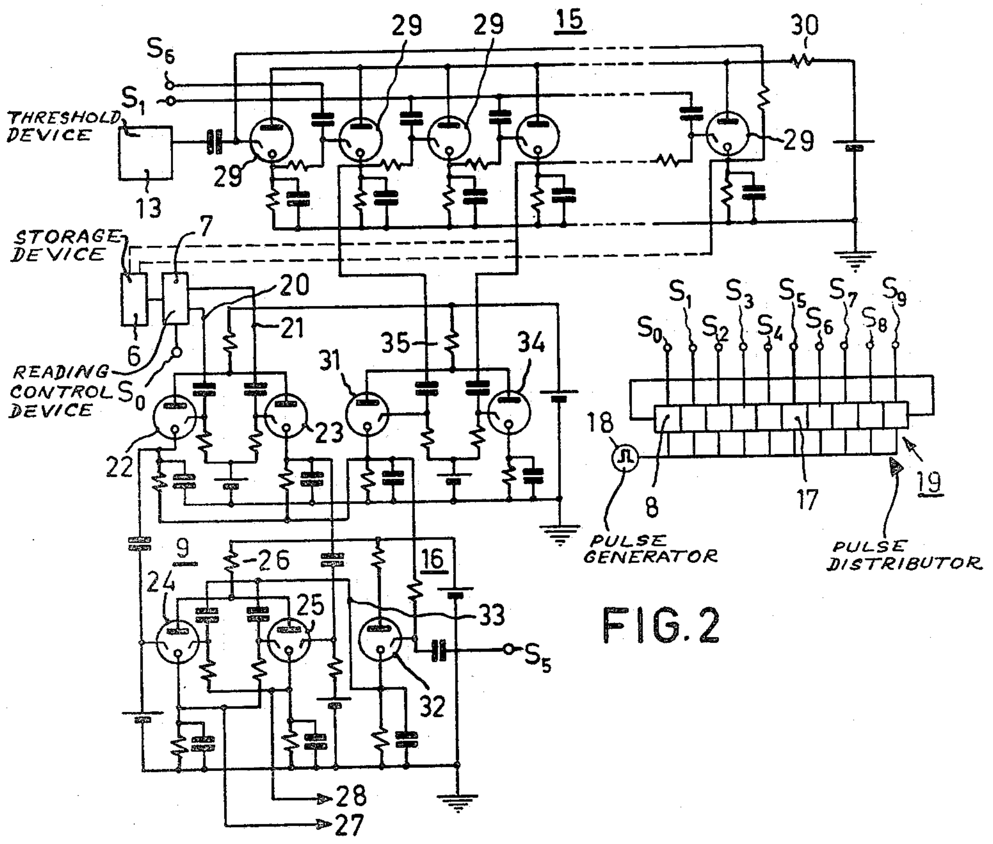
FIG. 2 is a circuit of a part of the transmitter of FIG. 1.

FIG. 2 shows in some detail the part of the transmitter $T_1$ enclosed by dashed lines in FIG. 1. The reference numeral 18 designates a pulse generator connected to a distributor circuit 19. The pulse generator supplies, in order of succession, pulses to the outputs designated by $s_0$ to $s_9$, of the ten sections of the distributor circuit 19. The references $s_0$ to $s_9$ are also used to denote the instants, when an output terminal supplies a pulse. The instant $s_0$ coincides with the beginning of a character element. The other instants subdivide the time interval between two successive instants $s_0$ into equal intervals. The terminals designated in the FIG. 2 by $s_0$ to $s_9$ are to be considered connected to corresponding outputs of the pulse distributor 19. The first section of the distributor circuit corresponds to the pulse generator 8 shown in FIG. 1. The output of the fifth section, designated by $s_5$ corresponds with the output of the delay circuit designated in FIG. 1 by numeral 17.

In normal operation, the reading device 7 supplies, at the instant $s_0$, a pulse to the conductor 20, when a space element is read from the storage device 6, and a pulse to the conductor 21, when a mark element is read. These pulses selectively fire the gas-filled tubes 22 and 23 respectively, which, subsequent to becoming conductive, automatically return to the non-conducting state due to the resistors included in the supply circuit, which have sufficiently high resistance that a discharge cannot be maintained. During the emission of the characteristic signal indicating reception of a multilated signal, these tubes are blocked in a manner to be described hereinafter. The pulses at the cathodes of the tubes 22 and 23 are applied to the bistable device 9. This device comprises two gas-filled tubes 24 and 25, which are supplied by way of a common anode resistor 26. It will be assumed that the tube 25 is conducting. A pulse from tube 22 fires the tube 24 and the resultant pulse produced across the resistor 26 cuts off tube 25. The output conductors 27 and 28 are connected to the modulator 4 of FIG 1.

Figure 4:
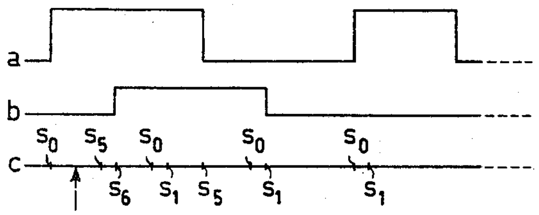

The control circuit 15 comprises a chain of gas-filled tubes 29, which have a common anode resistor 30. In the chain the cathode of each tube is connected to the firing electrode of the next-following tube. In the rest position only the last tube of the chain is conducting. This tube provides a blocking bias voltage for the firing electrode of the first tube. A signal from the threshold device 13 fires the first tube and the pulse produced across the resistor 30 cuts off the last tube. FIG. 4c shows a time axis, which is subdivided by the instants $s_0$ into intervals equal to the duration of a character element. Assuming that the instant when the first tube fires in response to a signal from device 13 coincides with the instant indicated by the arrow in FIG. 4, the second tube of the chain conducts at the next-following instant $s_6$. The state of this tube is illustrated in FIG. 4b. This tube fires tube 31, which supplies a blocking voltage to the tubes 22 and 23, so that the latter can no longer change their states. The tubes 24 and 25 do not change their states at the first-following instant $s_0$. The states of these tubes are illustrated in FIG. 4a. The tube 31 supplies, in addition, a bias voltage to the tube 32, which performs the function of the gate circuit 16 in FIG. 1. The tube 32 is fired at the further instant $s_5$ and thereafter automatically assumes the non-conducting state. The tube 32 supplies via the conductor 33 a control-pulse to the tubes 24 and 25, the states of which are thus changed, as illustrated in FIG. 4a. The conductor 33 is connected by way of capacitors to a second firing electrode of each of the two tubes. The tube 24, in its conducting state, supplies a bias voltage to tube 25 and in turn tube 25, in its conducting state, supplies a bias voltage to tube 24. The pulse on the conductor 33 fires the non-conducting tube and the pulse produced across the resistor 26 cuts off the other tube. The voltage conditions of the output conductors 27 and 28 thus vary at an instant $s_5$ which corresponds to the centers of the character elements. The remaining tubes of the chain are ignited at successive instants $s_1$. From one of these tubes a signal to terminate the emission of the charateristic signal is obtained. In this embodiment the termination signal is derived from the fourth tube. The fourth tube fires the tube 34, which has an anode resistor 35 in common to tube 31. The pulse produced across the resistor 35 extinguishes the tube 31, which removes the blocking voltage from the tubes 22 and 23 and suppresses the bias voltage of tube 32. The tubes 22 and 23 are thus again prepared to convey the pulses of the conductors 20 and 21 to the tubes 24 and 25. In the embodiment of FIG. 2, the gate circuit 16 allows one pulse to pass within the time interval determined by the device 15. As a matter of course, by a different choice of the time interval the number of pulses at instants $s_5$ which pass through the gate may be increased. Then the device 15 determines a second time interval, which terminates as soon as the last tube of the chain has ignited. The signals indicating the beginning and the end of the second time interval are transmitted to the storage 6 by way of conductors shown in broken lines. In this time interval the storage 6 switches over in the manner described above to the temporary storage, in which the last elements read by the device 7 are stored.

The first tube of the chain is blocked as soon as the last tube of the chain has fired. A signal from the threshold device 13 is then again capable of firing the first tube and starting the cycle described.

The part of the receiver $R_2$, outlined in FIG. 1, is a block diagram of a conventional synchronizing circuit. A differentiating circuit 35 differentiates the output signal of the detector 11 and supplies the pulses thus formed to a phase-comparison device 36. The pulses correspond to the transitions between the space elements and the mark elements in the telegraph signal. The device 36 is also controlled by a pulse generator 37, the phase of which is to be stabilized on the phase of the pulse sequence supplied by the circuit 35. The pulse generator 37 is connected to a phase corrector 38, to which a phase-correcting control-signal is fed, which is derived by way of an integrating circuit 39 from the phase comparison device 36. FIG. 1 also shows that the pulse generator 37 controls the pulse producer 14 by way of a delay circuit 40, having a suitably chosen time lag, so that the output pulses of the pulse producer 14 coincide with the centers of the sign elements.

Figure 5:
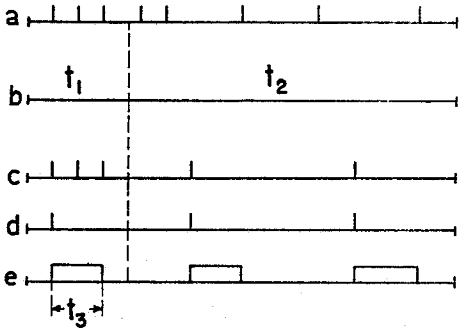

During a long disturbance of the radio path the transmitter may continuously transmit the characteristic signal indicating reception of the mutilated signals, followed by a sequence of sign elements previously emitted. Then at the output of the differentiating circuit 35 a sequence of pulses of the waveform illustrated in FIG. 5a occurs periodically. FIG. 5b shows a time axis subdivided into two intervals $t_1$ and $t_2$. In the interval $t_1$ the characteristic signal is received and in the interval $t_2$ sign elements already previously received are again received. These two time intervals correspond to the time intervals determined by the device 15. The characteristic signal may consist, for example, of three modulation alternations, each of which supplies a pulse via the differentiating circuit 35. The number of pulses in the interval $t_2$ depends upon the information content of the intelligence transmitted during this time interval.

The phase of each pulse is compared in known manner in the phase comparison device 36 with the phase of a pulse of the pulse generator 37. The output signal of the phase comparison device 36 is a measure of the direction of the phase deviation. The integrating circuit 39 averages this signal. The output signal of the integrating circuit 39 is thus a measure of the direction of the average phase deviation. The pulses in the time interval $t_2$ are shifted by an odd multiple of half the duration of a character element with respect to the pulses in the time interval $t_1$. When the phase deviation between the pulses from the pulse generator 37 and the pulses in the interval $t_2$ has a low positive value, the phase deviation between the pulses from the pulse generator 37 and the pulses in the interval $t_1$ has a low negative value. In the case illustrated in FIG. 5a the number of pulses in the interval $t_2$ is greater than the number of pulses in the interval $t_1$. The output signal of the integrating circuit 39, which averages the individual phase deviations, provides a signal which is a measure of the average phase deviation in the interval $t_2$. In order to ensure that the number of pulses in the interval $t_2$ is always greater than the number of pulses in the interval $t_1$, the length of the interval $t_2$ is chosen so great that with an arbitrary information content of the intelligence emitted in the interval $t_2$ this condition is fulfilled. It should be noted that each of the telegraph signs used for the transmission of intelligence contains at least one transition between a space element and a mark element. The length of the interval $t_2$ may be chosen so that at least a number of complete telegraph signals is emitted herein, and that this number exceeds by one the number of pulses in the interval $t_1$.

Another method for ensuring that the number of synchronizing pulses accepted in the time interval $t_1$ is less than the number of pulses accepted in the time interval $t_2$ is to apply the output of the differentiation circuit 35 to the phase comparator 36 by way of a gate circuit 41. The gate circuit 41, after the selection of a pulse, blocks itself during the time interval $t_3$. FIG. 5*e* illustrates the state of the gate circuit 41 when the pulse sequence at the output of the differentiating circuit 35 has the waveform illustrated in FIG. 5*c*. FIG. 5*d* shows the pulse sequence at the output of the gate circuit 41. By a suitable choice of the time interval $t_3$ it can be ensured that the number of output pulses of the gate circuit 41 in the time interval $t_3$ always exceeds the number of output pulses in the time interval $t_1$.

Figure 6:
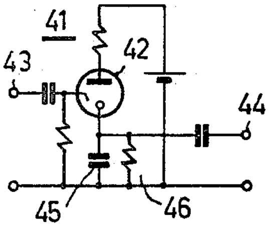
FIG. 6 shows a gate circuit.

FIG. 6 illustrates an embodiment of the gate circuit 41. The circuit comprises a gas-filled tube 42, which can be fired by the pulses fed to the input 43. The output pulses are derived from the terminal 44. As soon as the tube 42 has fired, the capacitor 45 is charged rapidly, after which the tube changes automatically to the non-conducting state. The capacitor 45 is discharged via the resistor 46. As long as the voltage of the capacitor still exceeds a given value, a pulse at the input 43 is not capable of refiring the tube 42. The time interval $t_3$ can thus be adjusted by the choice of the time constant of the parallel combination 45, 46.

Conventional circuits may be used for the circuits indicated by the blocks of FIG. 1 which are not specifically shown in FIGS. 2 and 6. For example, a frequency shift telegraphy transmitter of the type shown in U.S. Patent 2,698,876 may be employed for the circuits of blocks 3, 4 and 5. The receiver 10 may comprise conventional frequency conversion and amplifier stages such as shown for the input stages described in U.S. Patent 2,509,977. When frequency shift telegraphy is employed, the detector 11 may be a conventional discriminator, or a detector such as shown in U.S. Patent 2,849,607. For the synchronizing circuit including blocks 14 and 35 through 41, a synchronized generator such as shown in U.S. Patent 2,843,669 may be employed. The combined arrangement of a threshold device and telegraph receiver which may be employed for blocks 12 and 13 is described in U.S. Patent 3,003,031. A suitable threshold circuit is also shown in U.S. Patent 2,928,897. As stated previously, the storage device 6 may be a shift register. Shift registers suitable for this purpose are shown in U.S. Patents 2,907,898 and 3,008,006. The pulse distributor 19 and delay circuit 17 may also comprise a shift register, as above stated, or a counter as shown in U.S. Patent 2,730,658, and any conventional pulse generator circuit, such as shown in U.S. Patent 2,591,940, may be employed for pulse generators 8 and 14. U.S. Patent 2,928,897 discloses an arrangement suitable for the circuit of block 7. It will be understood, of course, that the above circuits are cited as examples only, and that the invention is not limited to the use of such specific circuits.

What is claimed is:

1. A telegraph transmission system comprising first and second stations, said first station comprising a first transmitter and a first receiver, said second station comprising a second transmitter and a second receiver, said second transmitter comprising means for transmitting a request for repeat signal upon reception of a mutiliated signal by said second receiver, said first receiver comprising means for receiving said request for repeat signal and applying a control signal to said first transmitter in response thereto, said first transmitter comprising a source of oscillations, means for transmitting said oscillations, modulator means for modulating said oscillations so that they selectively assume first and second oscillation states, storage means for storing telegraph signals, a source of sequential equally spaced pulses, means for reading out said storage means in response to said pulses and for applying the read-out telegraph signals to said modulator means whereby a telegraph character element is read out from said storage means upon the occurrence of each of said pulses, and means responsive to said control signal for changing the oscillation state of said oscillations at the centers of said character elements for a predetermined period.

2. Telegraph transmission apparatus comprising a transmitter and a receiver for transmitting and receiving, respectively, the mark and space elements of telegraph characters at periodically recurring timing instants, said receiver comprising means responsive to the reception of a mutilated signal for temporarily blocking itself and for providing a control signal, said transmitter comprising storage means for storing telegraph characters, means for reading out the character elements of said storage means at said timing instants in the order in which they were stored, means for transmitting said read-out character elements, said transmitting means having first and second transmitting states corresponding respectively to the transmission of said mark and space elements, control means, means applying said control signal to said control means, said control means being connected to interrupt the reading out of said storing means for a predetermined time in response to the reception of said control signal, said control means further comprising means responsive to the reception of said control signal for changing the transmission state of said transmitting means at instants halfway between said timing instants for the duration of said predetermined time.

3. Telegraph transmission apparatus comprising a transmitter and a receiver for synchronous transmission and reception respectively of mark and space elements of telegraph characters, said receiver comprising means responsive to the reception of mutilated signals for blocking itself for a given time and for producing a control signal, said transmitter comprising storage means for storing telegraph character elements, a source of sequential equally spaced first pulses, means connecting said source to said storage means for reading out said storage means whereby a separate character element is read upon the occurrence of each of said first pulses, a source of oscillations, bistable modulating means connected to said source of oscillations for modulating said oscillations so that they selectively assume first and second oscillation states corresponding to mark and space elements respectively depending upon the state of the bistable modulating means, means for transmitting said oscillations, means for applying said read-out character elements to said modulating means to control the state thereof, control means, means applying said control signal to said control means, said control means comprising means for interrupting the application of said read-out elements to said modulating means for a predetermined time in response to the reception of said control signal, and means providing second sequential pulses which occur between said first pulses, said control means comprising means for applying said second pulses to said modulating means for said predetermined time in response to reception of said control signal, whereby the state of oscillation of said oscillations is changed at each occurrence of a second pulse during said predetermined time.

4. Telegraph transmission apparatus comprising a transmitter and a receiver for synchronous transmission and reception respectively of mark and space elements of telegraph characters, said receiver comprising means responsive to the reception of mutilated signals for blocking itself for a given time and for producing a control signal, said transmitter comprising storage means for storing telegraph character elements, a source of sequential equally spaced first pulses, means connecting said source to said storage means for reading out said storage means whereby a separate character element is read upon the occurrence of each of said first pulses, a source of oscillations, bistable modulating means connected to said source of oscillations for modulating said oscillations so that they selectively assume first and second oscillation states corresponding to mark and space elements respectively depending upon the state of the bistable modulating means, means for transmitting said oscillations, means for applying said read-out character elements to said modulating means to control the state thereof, said storage means being of the type having a temporary storage for storing the last character elements transmitted by said transmitter, control means, means applying said control signal to said control means, said control means comprising means for interrupting the application of said read-out elements to said modulating means for a first predetermined period in response to the reception of said control signal, and means providing second sequential pulses which occur midway between said first pulses, said control means comprising means for applying said second pulses to said modulating means for said first predetermined period in response to the reception of said control signal, whereby the state of oscillation of said oscillations is changed at each occurrence of a second pulse during said first predetermined period, said control means further comprising means for reading out said temporary storage means and applying the output thereof to said modulating means for a second predetermined period following said first predetermined period, whereby the character elements in said temporary storage are transmitted by said transmitter.

5. The telegraph transmission apparatus of claim 4, wherein said first predetermined period is shorter than said second predetermined period.

6. The telegraph transmission apparatus of claim 4, wherein said receiver comprises means for deriving synchronization pulses from the transitions between mark and space elements, said receiver comprising pulse selecting means for providing pulses corresponding to the transitions between mark and space elements, and means for disabling said pulse selector for a predetermined time after the reception of a mutilated signal whereby the number of pulses selected during said first predetermined period is less than the number of pulses selected during said second predetermined period, and means for synchronizing said receiver by means of the pulses selected by said pulse selecting means.

7. A telegraph transmission system for the synchronous transmission of telegraph characters, comprising first and second stations each having a transmitter and receiver adapted to transmit and receive respectively the mark and space elements of telegraph characters at periodically recurring timing instants, each of said receivers comprising means responsive to the detection of mutilated received signals for blocking themselves for a first predetermined period and for producing a control signal, each of said transmitters comprising a source of telegraph character elements, a source of oscillations, means for modulating said oscillations so that they selectively assume first and second oscillation states corresponding to mark and space elements respectively, means for applying said telegraph character elements to said modulating means whereby said telegraph character elements are sequentially transmitted at said recurring timing instants, means responsive to a control signal from the receiver of the same station for interrupting the transmission of said telegraph character elements and for changing the oscillation state of said oscillations at the centers of said character elements for said first predetermined period, and means for sequentially retransmitting a predetermined number of character elements which were transmitted prior to the reception of said mutilated signal for a second predetermined period following said first predetermined period.

8. The system of claim 7, in which said means for applying said read-out elements to said modulating means comprises first bistable circuit means, said modulating means comprises second bistable circuit means, and said means for interrupting said transmission and changing the state of oscillations comprises third bistable circuit means connected to disable said first bistable means in one state thereof, a source of pulses occurring at the centers of said elements, and gate circuit means for applying said pulses to said third bistable circuit means during said first predetermined period, said transmitters further comprising timing means responsive to the reception of a control signal for changing said second bistable circuit means to said one state after the reception of said control signal, and timing means for changing said second bistable circuit means to its other state after the lapse of said first predetermined period, said second bistable circuit means being connected to open said gate circuit means only in said one state thereof.

References Cited by the Examiner

UNITED STATES PATENTS

| | | | |
|---|---|---|---|
| 2,903,514 | 9/1959 | Van Duren | 178—23.1 |
| 2,967,908 | 1/1961 | Gray et al. | 178—23.1 X |
| 3,001,017 | 9/1961 | Dirks | 178—23.1 |

ROBERT C. BAILEY, *Primary Examiner.*

MALCOLM A. MORRISON, *Examiner.*